US012116087B2

(12) United States Patent
Torre et al.

(10) Patent No.: US 12,116,087 B2
(45) Date of Patent: Oct. 15, 2024

(54) METHOD FOR INSPECTION OF CATENARY ANCHOR LINES CONNECTED TO A FLOATING OBJECT

(71) Applicant: SINGLE BUOY MOORINGS INC., Marly (CH)

(72) Inventors: Giorgio Torre, Bât. Aigue Marine (MC); Jeannin Antoine, Bât. Aigue Marine (MC); Rodrigo Vieira Camara De Castro, Bât. Aigue Marine (MC)

(73) Assignee: SINGLE BUOY MOORINGS INC., Marly (CH)

( * ) Notice: Subject to any disclaimer, the term of this patent is extended or adjusted under 35 U.S.C. 154(b) by 344 days.

(21) Appl. No.: 17/600,879

(22) PCT Filed: Jan. 30, 2020

(86) PCT No.: PCT/EP2020/052338
§ 371 (c)(1),
(2) Date: Oct. 1, 2021

(87) PCT Pub. No.: WO2020/200541
PCT Pub. Date: Oct. 8, 2020

(65) Prior Publication Data
US 2022/0185431 A1 Jun. 16, 2022

(30) Foreign Application Priority Data
Apr. 4, 2019 (EP) ..................................... 19167343

(51) Int. Cl.
*B63B 21/50* (2006.01)
*B63B 79/10* (2020.01)
(Continued)

(52) U.S. Cl.
CPC ............ *B63B 21/507* (2013.01); *B63B 79/10* (2020.01); *B63B 79/30* (2020.01); *G01L 5/102* (2013.01);
(Continued)

(58) Field of Classification Search
CPC ............ B63B 21/507; B63B 2021/007; B63B 2021/008; B63B 2021/009; B63B 79/30; B63B 79/10
See application file for complete search history.

(56) References Cited

U.S. PATENT DOCUMENTS 3,810,081 A * 5/1974 Rininger ................. G01S 15/42
73/862.391
4,610,007 A * 9/1986 Bannell ................... G01S 15/06
367/104

(Continued)

FOREIGN PATENT DOCUMENTS

WO    2007/079556         7/2007
WO    WO-2020200541 A1 * 10/2020 ............. B63B 21/50

OTHER PUBLICATIONS

International Search Report for PCT/EP2020/052338 dated Mar. 13, 2020, 4 pages.
(Continued)

*Primary Examiner* — S. Joseph Morano
*Assistant Examiner* — Jovon E Hayes
(74) *Attorney, Agent, or Firm* — NIXON & VANDERHYE

(57) ABSTRACT

The disclosed method measures a line angle of a mooring line connected to a floating object floating in a body of water, the mooring line being connected between the floating object and an anchoring body disposed in a bed of the body of water, in which the floating object is coupled to the mooring line by a line connector. The method includes:
(Continued)

defining at least three data points each associated with a respective location on the mooring line; on the data points obtaining a value associated with the location on the mooring line; determining parameters of an equation describing an anchor line curve from the values associated with the location on the mooring line for the data points; calculating at a predetermined position on the mooring line a line angle of the mooring line from a derivative of the equation at the predetermined position based on the parameters.

20 Claims, 3 Drawing Sheets

(51) Int. Cl.
  *B63B 79/30* (2020.01)
  *G01L 5/102* (2020.01)
  *B63B 21/00* (2006.01)
(52) U.S. Cl.
  CPC ... *B63B 2021/007* (2013.01); *B63B 2021/008* (2013.01); *B63B 2021/009* (2013.01)

(56) References Cited

U.S. PATENT DOCUMENTS

| | | | | |
|---|---|---|---|---|
| 4,912,464 | A * | 3/1990 | Bachman | B63B 21/22 367/141 |
| 5,970,901 | A * | 10/1999 | Bruce | B63B 21/00 73/152.01 |
| 7,316,196 | B2 * | 1/2008 | Haas | B63B 21/50 367/107 |
| 9,671,231 | B2 * | 6/2017 | O'Sullivan, Jr. | G01C 21/20 |
| 10,618,788 | B2 * | 4/2020 | Ijadi-Maghsoodi | B66D 1/00 |
| 2009/0287414 | A1 * | 11/2009 | Vickery | G01S 15/874 367/6 |
| 2013/0239649 | A1 * | 9/2013 | Jamieson | G01N 3/08 73/1.15 |

OTHER PUBLICATIONS

Written Opinion of the ISA for PCT/EP2020/052338 dated Mar. 13, 2020, 8 pages.

* cited by examiner

METHOD FOR INSPECTION OF CATENARY ANCHOR LINES CONNECTED TO A FLOATING OBJECT

This application is the U.S. national phase of International Application No. PCT/EP2020/052338 filed Jan. 30, 2020 which designated the U.S. and claims priority to EP Patent Application No. 19167343.3 filed Apr. 4, 2019, the entire contents of each of which are hereby incorporated by reference.

BACKGROUND OF THE INVENTION

Field of the Invention

The present invention relates to a method for measuring a line angle of a mooring line connected to a floating object. Also, the invention relates to a system for measuring a line angle of a mooring line connected to a floating object.

Description of the Related Art

There is a worldwide trend in the offshore industry to minimize diver intervention to reduce the associated risks of this kind of operation. At the same time, progress in automated control system have allowed the deployment of sophisticated vehicles in difficult environments.

For a floating object such as a buoy that is moored at sea by mooring lines, a periodic inspection of the submerged part of the floating object is required to check the state of the mooring lines and to avoid unexpected failure thereof. Mooring lines comprise lines made from synthetic material such as nylon and polyester, and/or steel wire or combinations thereof. Also a mooring line may consist of a mooring chain consisting of steel links or may comprise at least a segment of such a mooring chain.

One of the measures that need to be performed during the periodic inspection of the terminal is that of the line angles formed by the mooring lines with the vertical direction in close proximity of the buoy and of its mooring line connectors.

In particular for catenary anchor leg based mooring, i.e., for CALM terminals, where the buoy responds to even moderate sea states with a considerable amplitude of motions and speeds, the approach to the buoy by a diver or a remotely operated device (ROV) can be difficult. For example, a wave height of about one metre, can cause motion excursions of several meters for the terminal.

It is an object of the present invention to provide a method for measuring a line angle of the mooring line near the buoy, with adequate precision, but without divers or ROV and without directly approaching the buoy, thus avoiding a collision risk associated to large motions of the buoy.

SUMMARY OF THE INVENTION

The object is achieved by a method for measuring a line angle of at least one mooring line connected to a floating object, the floating object floating in a body of water, the mooring line being connected between the floating object and an anchoring body disposed in a bed of the body of water, in which the floating object is coupled to the mooring line by a line connector; the method comprising:
defining at least three data points each associated with a respective location on the mooring line;
on said at least three data points obtaining a respective value associated with the location on the mooring line;
determining parameters of an equation describing an anchor line curve from the obtained values associated with the location on the mooring line for said at least three data points;
calculating at a predetermined position on the mooring line a line angle of the mooring line from a derivative of the equation of the anchor line curve at the predetermined position based on the determined parameters, wherein the method further comprises:
providing a group of sensors, comprising at least three sensors, each of the sensors configured for measuring the respective value associated with the mooring line;
on each of the at least three data points installing an associated sensor on the mooring line from the group of sensors, the sensors each being configured for measuring a the respective value associated with the mooring line and for transmitting a signal of said measured value, wherein at least a second sensor and a third sensor are installed on predetermined locations on the mooring line by a remotely operated underwater vehicle, ROV, and the step of obtaining the values on the at least three data points comprises receiving from each associated sensor the signal of the respective measured value, and associating for each received signal the measured value with the location of the data point on the mooring line.

The method allows to measure the anchor line curve from either positions of at least three points or positions at a first and a second point plus a local line angle of the anchor line curve at a third point, and determine the line angle without the need to perform a measurement in the submerged zone adjacent to the buoy by a diver or ROV.

The invention also relates to a system for measuring a line angle of a mooring line connected to a floating object. Moreover, the present invention relates to a floating object provided with a system for measuring a line angle of a mooring line connected to the floating object.

BRIEF DESCRIPTION OF THE DRAWINGS

Embodiments of the present invention will be described hereinafter, by way of example only, with reference to the accompanying drawings which are schematic in nature and therefore not necessarily drawn to scale. In the drawings, identical or similar elements are indicated by the same reference sign.

DESCRIPTION OF THE PREFERRED EMBODIMENTS

Figure 1:
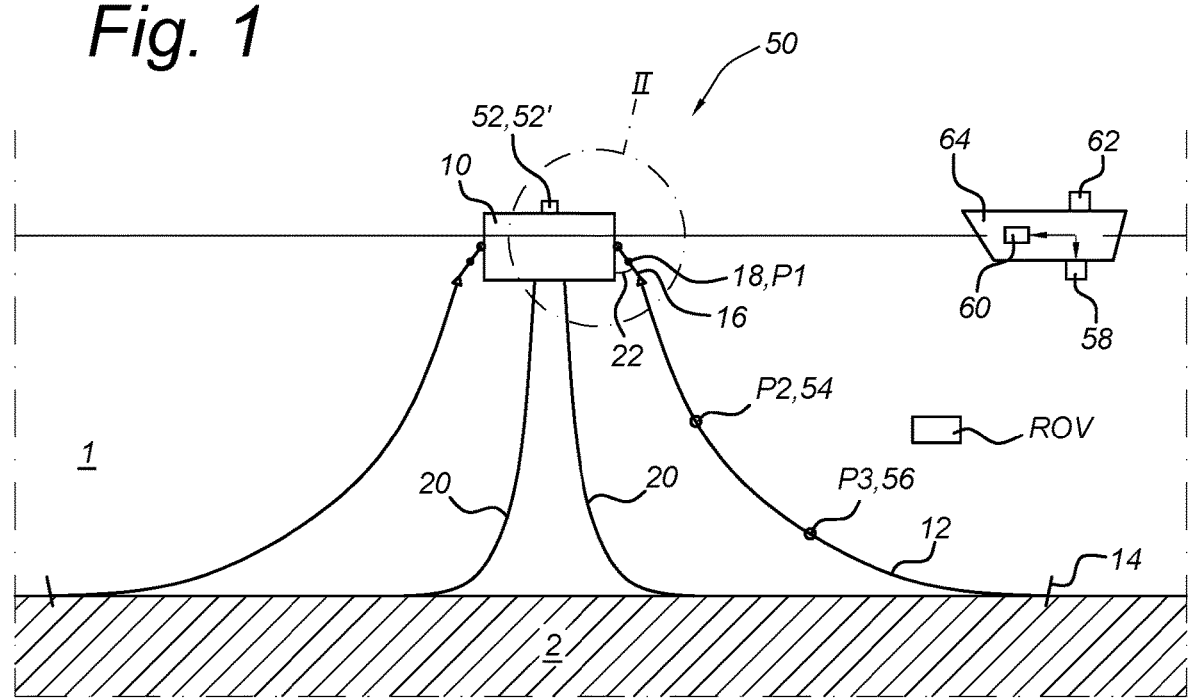
FIG. 1 schematically shows a floating object moored in a body of water illustrating an embodiment of the invention.

FIG. 1 schematically shows a floating object moored in a body of water illustrating an embodiment of the invention.

In a body of water 1 such as a sea or lake, a floating object 10 is moored by means of mooring lines 12 to anchoring bodies 14. Each anchoring body 14 is disposed on or in the sea bed 2 or lake bed 2.

Each mooring line 12 is connected to the floating object 10 by means of a line connector 16, that comprises an articulation 18 to allow a line angle 22 between the mooring line and the vertical (i.e., a mooring line angle) to change depending on forces exerted on the floating object, such as low-tide, high-tide, currents and storm.

Further, some risers 20 for transporting hydrocarbon liquid and/or gas may be running between well heads (not shown) on the sea bed 2 and the floating object 10.

To allow measurement of the line angle, a system 50 is provided for determining the line angle 22 at the articulation 18 from the shape of the mooring line 12 between the floating object 10 and the anchoring body 14. Here such a shape is referred to as an anchor line curve.

To determine the anchor line curve shape, it is considered to measure a geographical location (hereafter: geolocation) of at least three points P1, P2, P3 on the anchor line curve or a geolocation of two points P1, P2 plus a locally measured line angle at a third point P3 on the anchor line curve. Using the respective three geolocations (or the two geolocations plus a local line angle) of these at least one 3 points P1, P2, P3 a curve fitting procedure is performed to obtain a set of parameters describing the anchor line curve as function of the geolocation. From the set of parameters, a derivative of the anchor line curve can be calculated at the geolocation of the articulation 18, which is a predetermined location on the mooring line. From the derivative of the anchor line curve at the geolocation of the articulation 18, the line angle 22 at the articulation with the vertical is then established.

In case the geolocation of two points plus the locally measured line angle at the third point are measured, the locally measured line angle at the third point may be measured at a same location as the geolocation of the second point. The locations of the second and third points may coincide in that case.

The system comprises at least first, second and third position sensors 52, 54, 56, that are to be installed on the mooring line to be measured.

Further, the system comprises a first device 58 for receiving from each position sensor 52, 54, 56 the respective position signal and a second device 60 for determining from each received position signal the location of the respective position sensor, the location of the point on the mooring line associated with the respective position sensor.

In an embodiment, each of the at least first, second and third position sensors 52, 54, 56 is a transponder that is configured to transmit a signal relating to the respective location thereof. The first device 58 is a transceiver that is configured to transmit signals to the position sensors to initiate the transmission of the location related signals from the transponders, and to receive the location related signals from the transponders.

Depending on the transponder or sensor type, the location related signals can comprise data of either absolute locations or relative locations. The absolute locations can comprise geographical coordinates. The relative locations can comprise locations relative to the location of the first device 58.

In a further embodiment, the first position sensor 52 is based on a first GPS sensor which is configured to produce first position sensor geolocation coordinates. The first GPS sensor is installed on the floating object 10. Using the first position sensor geolocation coordinates from the first GPS sensor 52 a location of the centre of the articulation 18 of the line connector 16 is determined as the geolocation of the first point P1. This will be explained in more detail with reference to FIG. 2, below. The signals of the first GPS sensor 52 are received by a suitable receiver (not shown) and transferred to the second device 60 as geolocation of the floating object 10.

In a preferred embodiment, the first position sensor 52 is the first GPS sensor and the second and third position sensors 54, 56 are USBL (ultra-short baseline) transponders installed at a location of the second point and third point respectively.

According to a method of the invention, a remotely operated underwater vehicle (ROV) is used to install them on the mooring line. Advantageously, the use of the ROV allows diver-less deployment of the underwater position sensors 54, 56

The location of the second point and third point are obtained by the USBL transceiver 58 from the readings of the USBL transponders 54, 56. Typically, the transceiver 58 and second device 60 are deployed on a support vessel 64, positioned at some distance from the floating object.

In case the USBL transceiver 58 is associated with a second GPS sensor 62, the locations of the second point and third point can be referenced to absolute locations (geolocations) of the second point and third point P2, P3 through the GPS coordinates of the second GPS sensor 62 associated with the USBL transceiver 58. The second GPS sensor 62 is typically close to the USBL transceiver 58, on the support vessel 64. In this manner, the location of the USBL transceiver can be determined from a GPS location by the second GPS sensor associated with the USBL transceiver.

The second device 60 is a computational device capable of executing a first computational procedure for determining parameter values of an equation describing an anchor line curve passing through the respective locations of said at least three points P1, P2, P3, obtained as described above, and may be based on any suitable numerical curve fitting method.

Alternatively, the first computational procedure may comprise determining parameter values of an equation describing an anchor line curve passing through the respective locations of two points P1, P2, plus taking into account a locally measured line angle at a third point P3 (which third point may coincide with the second point).

Additionally, the second device 60 is capable of executing a second computational procedure for calculating at a predetermined position on the mooring line a line angle 22 with the vertical direction from a derivative of the equation of the anchor line curve based on the determined parameter values.

An embodiment of the first and second computational procedures will be described in more detail with reference to FIG. 3.

The skilled person will appreciate that the second device 60 can be a single computational device, or a number of computational devices arranged in a network, arranged for carrying out the computational procedures. The second device 60 is connected to the first device 58 for data-communication by a network (not shown), either wired or wireless, and may be located at a same location as the first device 58, but could be located at a different location.

According to the invention, the line angle 22 at the articulation is determined from parameters describing the anchor line curve shape by using computation involving the derivative of the anchor line curve at the location of the articulation 18 of the line connector 16.

Figure 2:
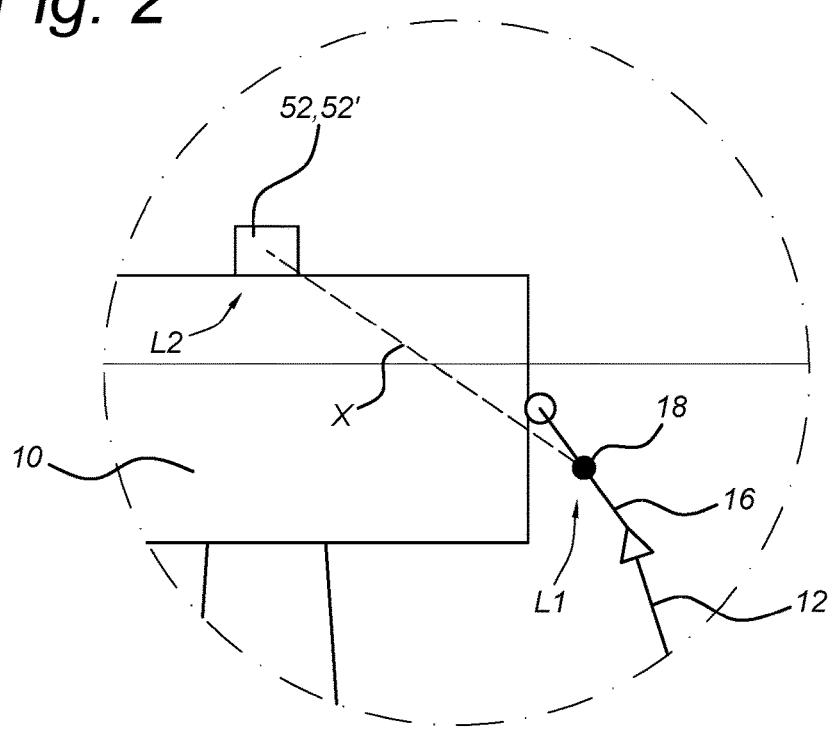
FIG. 2 schematically shows a portion of FIG. 1 in more detail

FIG. 2 schematically shows a part of FIG. 1 in more detail.

In case the first position sensor 52 on the floating object 10 is a first GPS sensor as described above, the centre of the articulation 18 of the line connector 16 is taken as the geolocation of the first point. The geolocation of the first point is then calculated from the geolocation of the first GPS sensor on the floating object 10 with a correction for the distance between a location L2 of the first GPS sensor on the floating object and a location L1 of the centre of the articulation 18. The correction can be determined from the actual layout of the floating object construction and a position of the centre of the articulation 18 of the line connector 16 at the floating object 10, corresponding to a distance vector denoted X (indicated by dashed line) between the centre of the articulation 18 and the actual position of the first GPS sensor 52 on the floating object 10, i.e., between location L2 and location L1.

In an embodiment, the correction is performed by the second device 60.

Figure 3:
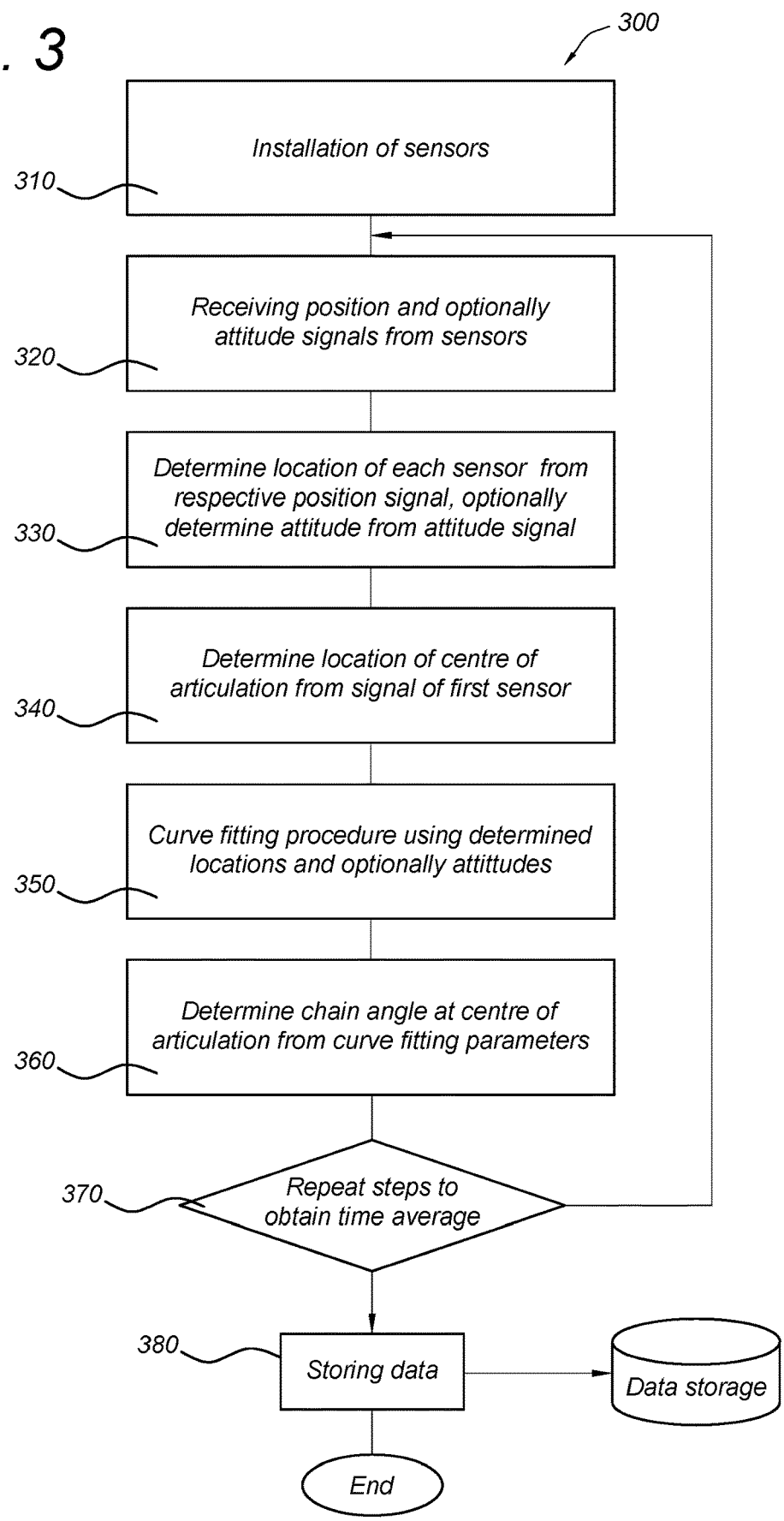
FIG. 3 shows a flow diagram of a method in accordance with an embodiment of the invention, and FIG. 4 schematically shows a floating object moored in a body of water illustrating an embodiment of the invention.

FIG. 3 shows a flow diagram of a method in accordance with an embodiment of the invention.

According to an embodiment of the invention, a method is provided for carrying out a procedure 300 to determine a line angle value 22 for the floating object 10 moored by the mooring line 12.

In a first step 310, the method comprises the installation of the first GPS sensor as the first sensor on the floating object and at least the second and third sensors on the mooring line. Also this step comprises the deployment of a measurement facility 64 comprising at least the first device 58 at some distance from the floating object and mooring line. The second device 60 may be located at the measurement facility 64 near the first device 58, but alternatively could be located at a different location.

In a subsequent step 320, the method comprises the step of receiving by the first computational device 58, location related signals from the first position sensor and at least one of the second and third sensors.

Additionally, the first position sensor can be equipped with an attitude sensor to measure local attitude or local line angle related signal in combination with the position signal.

In an alternative embodiment, location related signals are received from the second position sensor and local line angle related signals are received from the third sensor.

In a next step, the second device 60 is arranged to carry out a procedure 330 to determine the location of each of the first position sensor and at least the second and third sensor on the mooring line 12. The determined locations can be either relative locations, with relative positions with respect to the location of the measurement facility or absolute locations for example defined as geolocations.

In a subsequent step, the second computation device 60 is arranged to carry out a procedure 340 to determine the location of the first point at the centre of the articulation 18 of the line connector 16 from the location of the first position sensor and the distance vector X.

In a next step, the second device 60 is arranged to carry out a procedure 350 to determine parameter values that describe the anchor line curve shape as a function of the location of the at least three points on the mooring line 12 (or the location of two points on the mooring line plus a local line angle at a point on the mooring line). The procedure 350 may use a curve fitting method to obtain the parameter values.

In a further step, the second device 60 is arranged to carry out a procedure 360 to determine a line angle value at the location of the centre of the articulation 18 of the line connector 16, by calculating the local derivative at the latter location.

Optionally, the line angle value can be determined repeatedly over time to obtain a time-average of the line angle value (and/or any one of the values of the curve fitting parameters, the locations of the at least three points and/or the locations of the at least three position sensors), by repeating the procedural steps 320-360, as described above.

In a further embodiment, the method comprises in a step 380 that real-time values or time-averaged values of the line angle, and/or the curve fitting parameters, and/or the locations of the at least three points and/or the locations of the at least three position sensors are stored in a computer readable medium.

Such a method may comprise storing a value of at least the calculated line angle with either the vertical or the horizontal direction in a computer readable medium, and/or storing a value of the measured positions for the at least three data points on the mooring line in a computer readable medium, and/or storing a value of measured position signals from the at least three position sensors in a computer readable medium, and/or storing a value of determined parameters of the equation describing the anchor line curve from the measured values associated with the location on the mooring line for said at least three data points.

The stored data values can be used for example for on-line or off-line analysis, but also in relation to process monitoring or process control when a vessel (not shown) is moored at the floating object 10 for offloading liquid or gaseous hydrocarbons from the risers 20.

In an embodiment, the mooring buoy arrangement is used in a water depth of about 2000 m or less.

Figure 4:
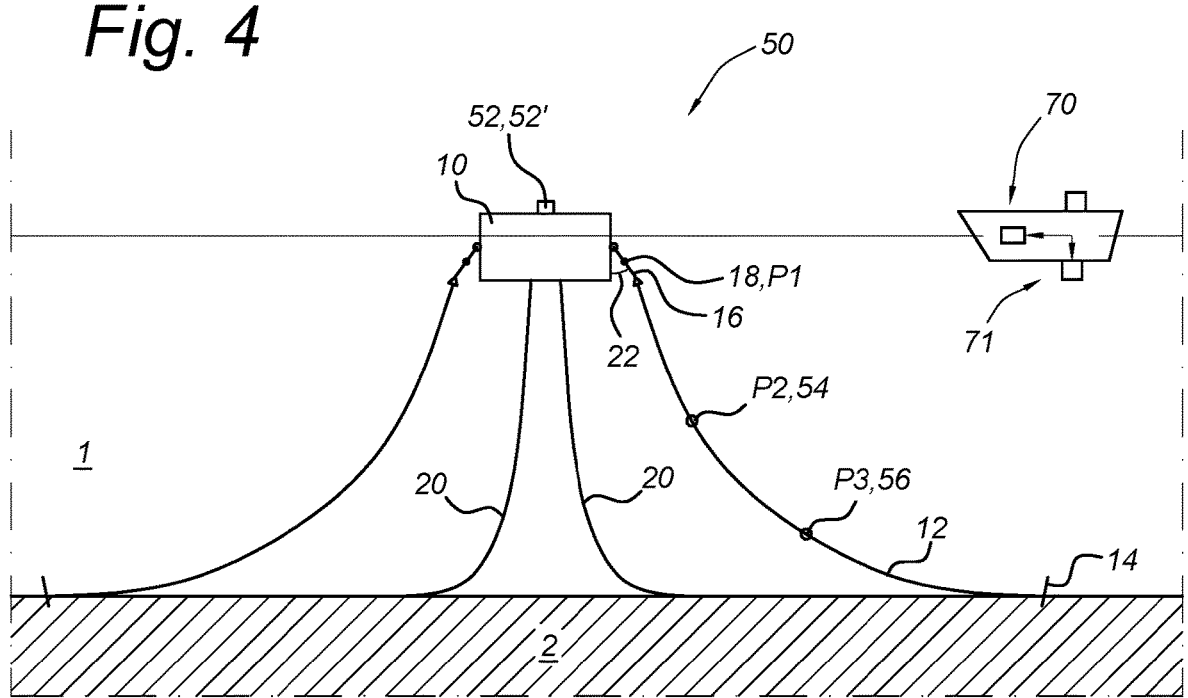

FIG. 4 schematically shows a floating object moored in a body of water illustrating an embodiment of the invention.

In FIG. 4 entities with the same reference number as shown in FIGS. 1-3 refer to corresponding entities.

According to an embodiment of the invention, a method is provided for measuring the chain angle which comprises indirectly measuring a top angle of at least one mooring chain connected to a floating object 10 via a 3D bathymetry system 71 attached to an unmanned surface vehicle 70. The top angle is determined by fitting of the catenary line to bathymetry reflection points together with a 3D surface fit.

The method comprises:
i. navigating around the floating object with the unmanned surface vehicle 70 (a fully remotely operated survey vehicle) while acquiring a 3D point cloud representative of the subsea layout mapping underneath the floating terminal.

The 3D bathymetry system 71, attached to the unmanned surface vehicle 70, emits acoustic waves towards the seabed and every time the acoustic waves come across a subsea structure, there is a reflection of the acoustic waves back to the bathymetry system. The amount of time it takes for the acoustic waves to bounce off structures on the seabed 2 and return to (a receiver of) the 3D bathymetry system is used to determine exact coordinates and depth of each reflection point, creating an accurate field layout mapping of all underwater structures underneath the floating object.

ii. post processing the respective 3D point cloud using advanced data analytics tools by interpolating a best-fitting 3D surface among the reflection points that represent the catenary line (for example by parametrizing a catenary line equation using nonlinear least-squares regression analysis) for one or more of the mooring lines 12 while computing best confidence, prediction and calibration intervals using well-known statistical tools.

iii. calculating a top inclination (top angle) value of each measured mooring line with (predetermined) adequate precision and accuracy from a derivative of the equation of the anchor line curve at a predetermined position.

The foregoing description details certain embodiments of the invention. It will be appreciated, however, that no matter how detailed the foregoing appears in text, the invention may be practiced in various ways.

While the above detailed description has shown, described, and pointed out novel features of the invention as applied to various embodiments, it will be understood that various modifications in the form and details of the system or method illustrated may be made by those skilled in the art without departing from the spirit of the invention. The scope of the invention is indicated by the appended claims rather than by the foregoing description. All modifications that come within the meaning and range of equivalency of the claims are to be embraced within their scope.

The invention claimed is:

1. A method for measuring a line angle of at least one mooring line connected to a floating object, the floating object floating in a body of water, the mooring line being connected between the floating object and an anchoring body disposed in a bed of the body of water, in which the floating object is coupled to the mooring line by a line connector;

the method comprising:
defining at least three data points each associated with a respective location on the mooring line;
on said at least three data points obtaining a respective value associated with the location on the mooring line;
determining parameters of an equation describing an anchor line curve from the obtained values associated with the location on the mooring line for said at least three data points;
calculating at a predetermined position on the mooring line a line angle of the mooring line from a derivative of the equation of the anchor line curve at the predetermined position based on the determined parameters,
wherein the method further comprises:
providing a group of sensors, comprising at least three sensors, each of the sensors configured for measuring the respective value associated with the mooring line on one of the at least three data points and for transmitting a signal of said measured value,
wherein a first position sensor from the group of sensors is positioned on the floating object and comprises a GPS sensor;
the method further comprising: determining a location of the center of an articulation of the line connector from the position of the first position sensor as a value of a first data point, and
wherein a second sensor and a third sensor each comprise an ultra-short baseline, USBL, transponder, and are positioned at a respective second and third location on the mooring line, at least the second sensor being a position sensor and the values measured by the position sensor being associated with the respective location of the respective position sensor;
wherein at least the second sensor and the third sensor are installed on predetermined locations on the mooring line by a remotely operated underwater vehicle, ROV, and
the step of obtaining the values on the at least three data points comprises receiving from each associated sensor the signal of the respective measured value, and associating for each received signal the measured value with the location of the data point on the mooring line,
wherein the location of the second sensor and of the third sensor, if the third sensor is a position sensor, is determined by:
in response to a transmission by a USBL transceiver, receiving the measured signals from the respective USBL transponder by said USBL transceiver, the USBL transceiver being at a remote location,
determining coordinates of the position of the second and third position sensors from the respective measured signal such that the coordinates of the second and third sensors are each referenced to a location of the USBL transceiver.

2. The method according to claim 1, wherein the third location and the second location on the mooring line substantially coincide.

3. The method according to claim 1, wherein the predetermined position is a first location on the line connector.

4. The method according to claim 1, wherein the location of the first data point is determined from coordinates obtained from at least the first position sensor and a layout of the floating object.

5. The method according to claim 1, wherein the first position sensor additionally comprises an associated attitude sensor, and the method further comprises determining the local line angle at the location of the first data point from the value measured by the associated attitude sensor on the floating object, using the layout of the floating object.

6. The method according to claim 1, wherein the second sensor is located on the mooring line at a position between the line connector and the anchoring body, and the third sensor is located at a position between the second point and the anchoring body.

7. The method according to claim 1, wherein an average of the calculated line angle is determined as a function of time.

8. A system for measuring a line angle of at least one mooring line connected to a floating object moored in a body of water by the mooring line, the mooring line being connected between the floating object and an anchoring body disposed on a bed of the body of water, in which the floating object is coupled to the mooring line by a line connector, wherein the system is configured to carry out a method comprising:
defining at least three data points each associated with a respective location on the mooring line;
on said at least three data points obtaining a respective value associated with the location on the mooring line;
determining parameters of an equation describing an anchor line curve from the measured values associated with the location on the mooring line for said at least three data points;
calculating at a predetermined position on the mooring line a line angle of the mooring line from a derivative of the equation of the anchor line curve based on the determined parameters,
wherein the system comprises:
a group of at least three sensors, each of the sensors configured for measuring the respective value associated with the mooring line on one of the at least three data points of said measured value, wherein a first position sensor from the group of sensors is positioned on the floating object and comprises a GPS sensor; and wherein a second sensor and a third sensor each comprise an ultra-short baseline, USBL, transponder, and are positioned at a respective second and third location on the mooring line, at least the second sensor being a position sensor and the values measured by the position sensor being associated with the respective location of the respective position sensor and a USBL transceiver for receiving from each sensor the respective sensor signal of the respective measured value and means for associating for each received signal the measured value with the location of the data point on the mooring line.

9. The system according to claim 8, wherein the USBL transceiver is at a remote location from the floating object.

10. The system according to claim 8, wherein the USBL transceiver is associated with a second GPS sensor, for referencing the locations of the second point and third point to absolute locations through the GPS coordinates of the second GPS sensor.

11. A floating object moored in a body of water by at least one mooring line, the mooring line being connected between the floating object and an anchoring body disposed in a bed of the body of water, in which the floating object is coupled to the mooring line by a line connector, provided with a system for measuring a line angle of the at least one mooring line in accordance with claim 8.

12. The method according to claim 2, wherein the location of the first data point is determined from coordinates obtained from at least the first position sensor and a layout of the floating object.

13. The method according to claim 3, wherein the location of the first data point is determined from coordinates obtained from at least the first position sensor and a layout of the floating object.

14. The system according to claim 9, wherein the USBL transceiver is associated with a second GPS sensor, for referencing the locations of the second point and third point to absolute locations through the GPS coordinates of the second GPS sensor.

15. The method according to claim 1, wherein the predetermined position is a first location on the line connector, the first location being a center of an articulation of the line connector.

16. The method of claim 4, wherein the location of the first data point is determined from coordinates obtained from at least the first position sensor and a distance vector between a location of the first position sensor on the floating object and the center of the line connector.

17. The method according to claim 1, wherein the first position sensor additionally comprises an associated attitude sensor, and the method further comprises determining the local line angle at the location of the first data point from the value measured by the associated attitude sensor on the floating object, using the layout of the floating object from coordinates obtained from the first position sensor and the distance vector between the location of the first position sensor on the floating object and the center of the line connector.

18. The system of claim 9, wherein the remote location is a support vessel positioned at some distance from the floating object.

19. The method according to claim 2, wherein the first position sensor additionally comprises an associated attitude sensor, and the method further comprises determining the local line angle at the location of the first data point from the value measured by the associated attitude sensor on the floating object, using the layout of the floating object.

20. The method according to claim 3, wherein the first position sensor additionally comprises an associated attitude sensor, and the method further comprises determining the local line angle at the location of the first data point from the value measured by the associated attitude sensor on the floating object, using the layout of the floating object.

* * * * *